Jan. 29, 1963   G. L. HAZEN   3,075,657
SILAGE HANDLING APPARATUS
Filed Sept. 21, 1959   6 Sheets-Sheet 1

INVENTOR.
GRETZOLON L. HAZEN
BY
Wheeler, Wheeler & Wheeler
ATTORNEYS.

United States Patent Office 3,075,657
Patented Jan. 29, 1963

3,075,657
SILAGE HANDLING APPARATUS
Gretzelon L. Hazen, Fort Atkinson, Wis., assignor to Rockwood & Co., Chicago, Ill., a corporation of Delaware
Filed Sept. 21, 1959, Ser. No. 841,366
17 Claims. (Cl. 214—17)

This invention relates to silage handling apparatus especially adapted to load silage into and unload silage from large silos.

Large "tub" silos having a storage capacity of 500 or 600 tons of silage (this being four or five times as large as a conventional silo) are coming into increasing use. However, the loading and unloading of such large silos presents problems with which conventional silage handling equipment is unable to cope. The distance from the center of the silo to the side wall thereof is very much greater than in smaller conventional silos. Accordingly, conventional silo unloaders which rely upon a blower or thrower impeller convey silage from the center of the silo into the discharge chute at the side thereof are unable to convey the silage that far without requiring excessively high power for the impelling apparatus.

Moreover, it is difficult to properly fill and pack such large silos with conventional pneumatic silage filling apparatus because of the large cross section of the silo. Silage blown into the silo through a conventional ensilage blower will not be properly and uniformly spread throughout the cross section of the silo. On the contrary, silage will tend to build up beneath the discharge spout of the ensilage blower.

The silage handling apparatus of the present invention serves both to fill the silo and to empty it. Accordingly, the same apparatus serves a double purpose. Moreover, instead of attempting to lift the silage pneumatically to blow it out of the silo, the force of gravity is relied upon simply to unload the silo by dropping the silage down a channel or hole which is formed in the silage in the course of filling the silo. Accordingly, the power requirements for the instant apparatus are less than they might otherwise be and will not unduly increase the cost of equipment or overload the farmer's electrical system.

While the invention may be embodied in several different specific structures, an important feature of the invention which is common to all such embodiments is a silage handler used both to distribute the silage in the loading operation and to gather the silage in the unloading operation. In its preferred form, the silage handler comprises a horizontal auger conveyor which is radially disposed in the silo and is provided with means for rotating or sweeping it in a horizontal plane about the axis of the center of the silo. When the silo is being filled, this conveyor is operated to move silage from the center of the silo toward the outer wall at the same time that it distributes the silage evenly throughout the cross section of the silo. The silage handler carries suspended beneath it a channel-forming tube against which the distributed silage packs to form a self-supporting vertical channel through the silage in the silo. This channel is aligned with the intake opening of a silage discharge conveyor which runs through the bottom of the silo and into the barn and preferably along the line of cattle stanchions for the purpose of feeding silage from the silo to the cattle.

The tube may be relatively short, and as the silage handler is lifted in the course of filling the silo, the tube will be drawn upwardly with the handler to leave the channel aforesaid self-supporting. After the silo has been filled, it will have a central vertical channel opening into the inlet of the discharge conveyor aforesaid.

Silage loaded as aforesaid is packed so uniformly and firmly that the channel aforesaid will not collapse. After the silo is filled, the tube is completely withdrawn from the channel and is stored away pending need for it. In the preferred embodiment it is stored as part of the suspension system for the silage handler. If the silage is not to be used immediately, a plastic film or the like may be spread thereon as a protective cover. When silage is to be drawn or unloaded from the silo, the same silage handler is used to gather silage from the top thereof and propel it toward the vertical channel at the center of the silo, through which it drops by gravity into the inlet of the silage discharge conveyor. The only modification in the operation of the silage handler is to reverse the direction in which the conveyor (auger) operates, and to gradually lower the handler as silage is unloaded.

The handler will rotate in a horizontal plane so as to sweep completely around the silo as it gathers and feeds the silage to the central channel. Accordingly, the same silage handling conveyor is used both in the course of filling the silo and in discharging silage therefrom.

Other features of the invention relate to the apparatus for supporting the silage handler within the silo, the apparatus for feeding silage into the handler during the course of filling the silo, the apparatus for propelling the silage handler around the silo both in the course of filling and discharging silage, etc.

Other objects, features and advantages of the invention will appear from the following disclosure in which.

Silo 20 is ordinarily built adjacent a cattle barn. According to the present invention there is built into the bottom of silo 20 a concrete or like silage discharge duct 21 through which silage conveyor belt 22 is drawn by cable 19. Conveyor 22 is provided with paddles or flights 23 attached directly to the cable 19 and which pick up silage dropped into the duct 21 through its inlet 24.

Duct 21 is desirably aligned with the head ends of cattle stalls or stanchions within the barn so that cattle may feed directly from the conveyor.

Figure 1:
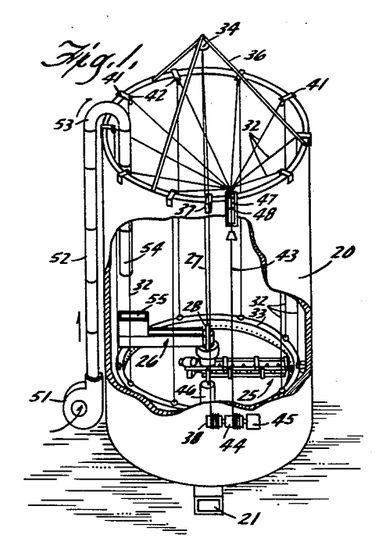
FIG. 1 is a small scale perspective view showing a silo in which one embodiment of silage handling apparatus embodying the invention is incorporated, portions of the silo wall being cut away to expose the operating mechanism.
Figures 8, 9:
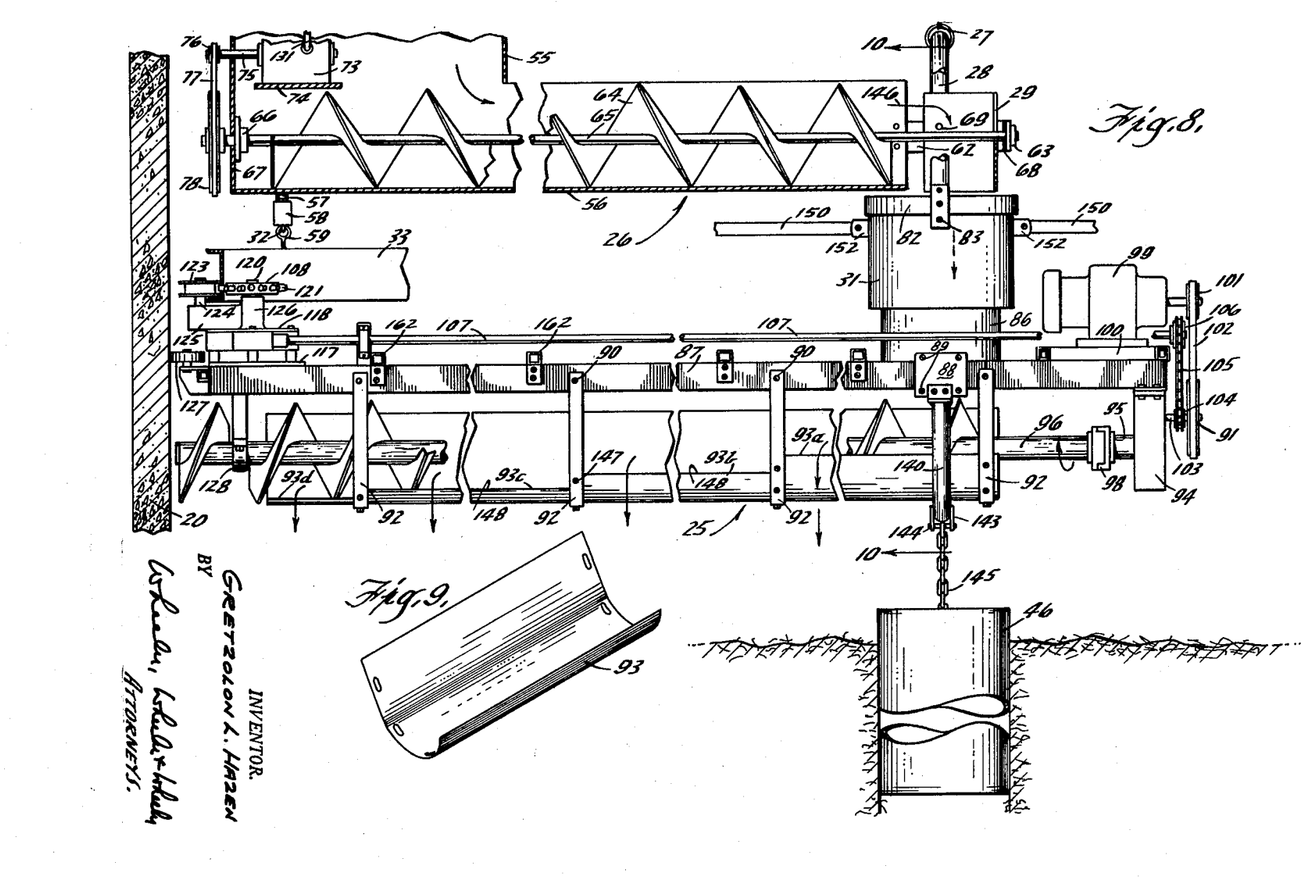
FIG. 8 is a fragmentary side elevation of the device shown in FIG. 5, portions being broken away and shown in cross section and a portion of the silo wall also being shown in cross section.
FIG. 9 is a detail view in perspective of one of the trough sections which is removably mounted on the silo handler distributing conveyor when the silo is being filled.

The silage handling apparatus of the embodiment of the invention shown in FIG. 1 comprises two conveyors 25, 26, each of which desirably includes an auger and each of which is desirably arranged radially within the silo and extends substantially from the wall of the silo to the center thereof, as is also shown in FIG. 8. Conveyor 26 is relatively stationary and conveyor 25 sweeps around the silo, as hereinafter explained.

The portions of both conveyors 25, 26 at the center of the silo are supported from a suspension cable 27 connected to bail 28 on which the inner ends of the conveyors 25, 26 are supported. The outer ends of the respective conveyors 25, 26 are supported by a series of cables 32 on which the traction ring 33 is suspended.

As best shown in FIG. 1, cable 27 is reeved over pulley 34 at the apex of support tripod 36. The lower ends of the tripod legs are supported on the silo wall. Cable 27 is thence trained over pulley 37 on the side of the silo and is connected to the hoist drum 38 powered by hoist motor 45.

The cables 32 for the traction ring 33 are each reeved over its individual pulley 42 respectively hooked by suitable clamp brackets 41 over the top edge of the silo wall 20 and are interconnected to a single cable 43 connected to the hoist drum 44 in turn powered by electric motor 45. Cable 43 draws all cables 32 through pulley 47 mounted by clamp bracket 48 to the rim of silo wall 20. Accordingly, the bail 28 which supports the central ends of both conveyors 25, 26 and the traction ring 33 which supports the outer ends of said conveyors are independently suspended from the top of the silo. Ordinarily both hoist drums 38, 44 will be actuated concurrently to raise and lower the silage handler as a unit. However, at such time that tube 46 is shifted from its position shown in FIG. 5 to its position shown in FIG. 6, cable 27 must be payed in independently of cables 32.

Conventional clutch means (not shown) is provided to selectively independently or concurrently power drums 38, 44 from motor 45.

Figure 5:
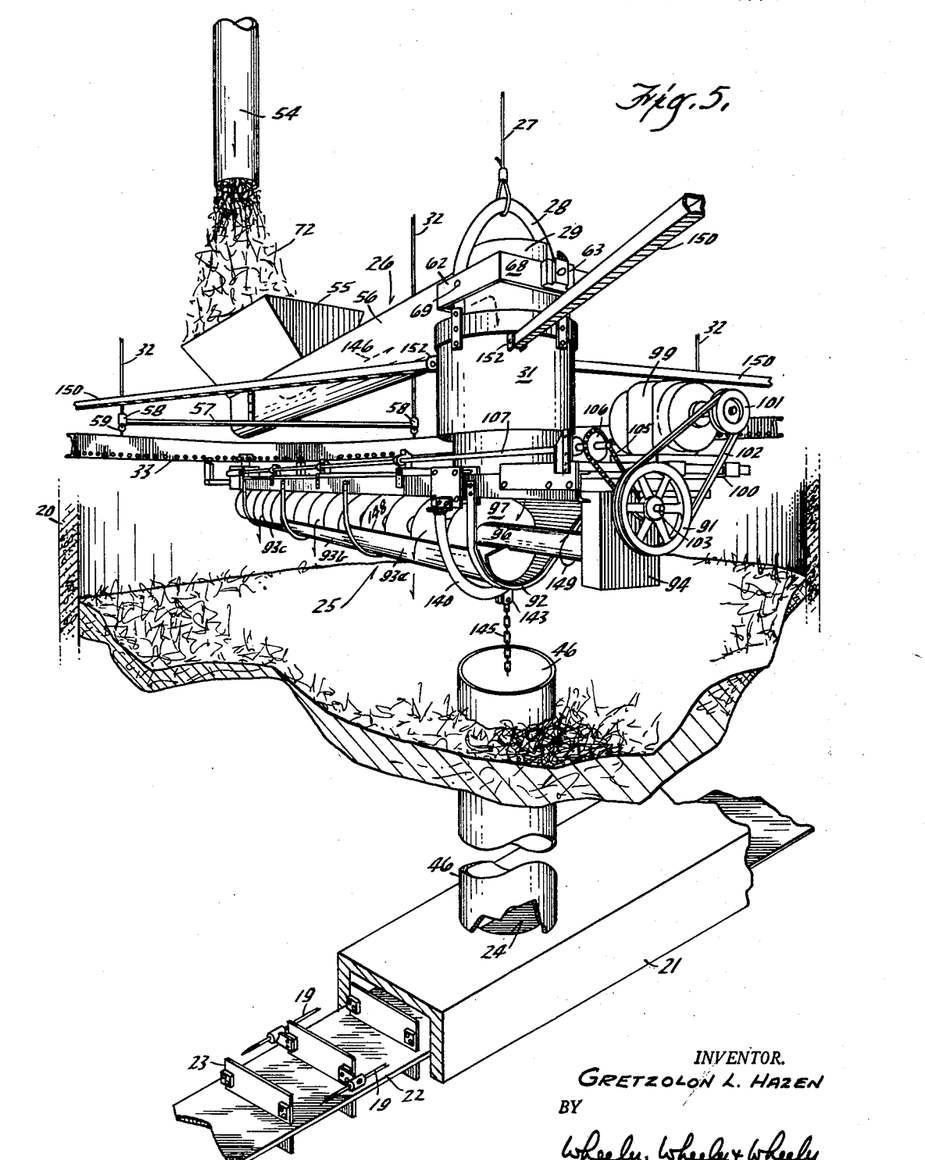
FIG. 5 is a fragmentary perspective view on a scale greatly enlarged as compared to FIGS. 1 and 2 and showing the silo handling apparatus of FIG. 1, with the parts thereof arranged during the course of filling the silo with silage.

When the silo is to be filled, the parts of the silage handler are assembled as shown in FIGS. 5 and 8. The silage is blown into the silo by the ensilage blower 51 through a lift tube 52 which has a discharge spout 53 which may extend downwardly into the silo as at 54 to discharge into the hopper 55 at the intake end of stationary conveyor 26. Conveyor 26 comprises a trough 56 supported at its outer end adjacent the wall 20 on a cross bar 57 having transverse end sleeves 58 through which the support cables 32 pass en route to connection to eye-bolts 59 in turn fastened to the traction ring 33. Accordingly, the hopper end 55 of the stationary auger conveyor 26 is suspended from the same cables 32 that support the traction ring 33.

The inner end of trough 56 is welded to bracket arms 62 pivotally connected by pivot pins 69 to the arms of bail 28. Auger 64 is mounted on auger shaft 65 supported at its outer end proximate silo wall 20 on the journal bearing 66 in end wall 67 of trough 56. The inner end of shaft 65 is journalled on bearing 63 on cross bracket 68 which spans across the ends of bracket arms 62. Arms 62 also carry deflector 29 which guides the flow of silage from the discharge end of conveyor 26 onto conveyor 25.

Shaft 65 of auger 64 is driven by an electric motor 73 mounted on bed plate 74 which spans across hopper 55. Motor 73 has a shaft 75 and a pulley 76 connected by belt 77 with pulley 78 mounted at the end of auger shaft 65.

Figure 10:
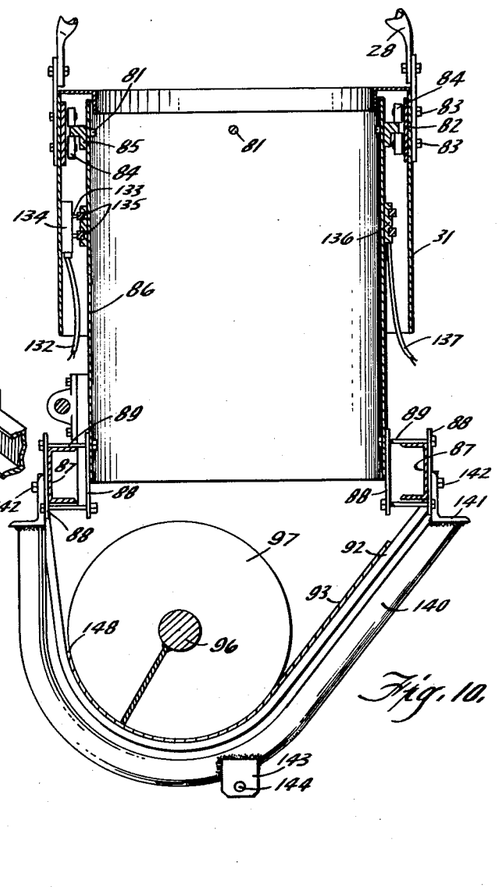
FIG. 10 is a cross section taken along the line 10—10 of FIG. 8.

Silage 72 blown into the silo and discharged into hopper 55 from spout 54 will be conveyed radially inwardly by auger conveyor 26 to the center of the silo and will fall by gravity through hollow sleeve 86 (FIG. 10) on which the inner end of conveyor 25 is suspended. The details of construction of the suspension for bearing sleeve 86 are best shown in FIG. 10. Bail 28 has downwardly extending support bracket strips 82 on which the slip ring shield 31 is hung by pins 83. The inner ends of pins 83 also carry support rollers 84 between which annular support track 85 is constrained to rotate. Track 85 carries on bolts 81 the suspension sleeve 86 to which the channel-shaped side arms 87 of the frame for lowermost conveyor 25 are mounted.

Side arm channels 87 are embraced between mounting pads 88 secured by means of the clamp bolts 89 to diametrically opposite points on the lower margin of sleeve 86. The channel-shaped arms 87 are connected on bolts 90 at spaced points along their length with auger trough hanger straps 92 in which trough sections 93 are supported.

At their ends near the center of the silo, the channel-shaped arms 87 carry a depending gear box 94 from which jack shaft 95 extends for coupling to the shaft 96 for auger 97 through flexible coupling 98. Gear box 94 is made sufficiently strong to carry the weight of the shaft and auger. The opposite end of shaft 96 is supported in journal bearing 128. Power for the auger 96, 97 is provided from electric motor 99 which is mounted on bracket plate 100 which spans across the top surface of the ends of arms 87. Motor shaft carries pulley 101 driving belt 102 trained on pulley 91 attached to shaft 103 which not only drives the gears within gear box 94, but which has a power takeoff sprocket 104 driving the chain 105 connected on sprocket 106 to the shaft 107 which powers the sprocket wheel 108 engaged with traction ring 33 for driving the auger 25 around the silo.

Figure 11:
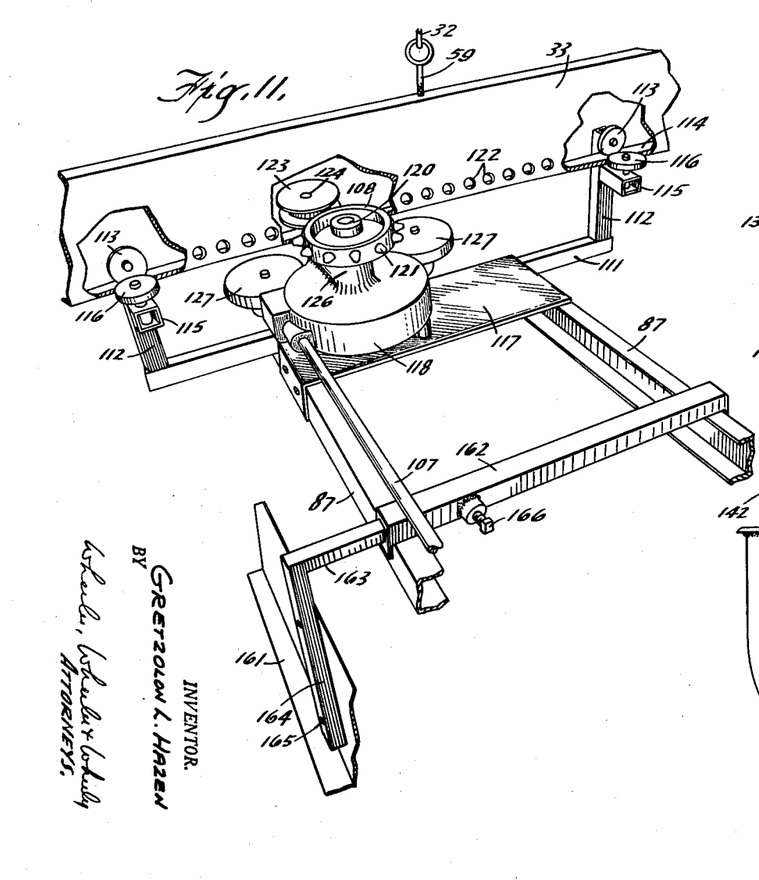
FIG. 11 is an enlarged perspective view showing the suspension and driving connections between the outboard end of the silage handling conveyor and the traction ring.

As best shown in FIG. 11, the outer ends of the channel-shaped arms 87 are suspended from hanger bar 111 which has upright posts 112 to the top ends of which are connected wheels 113 which support the auger conveyor frame 87 from the lower flange 114 of the channel-shaped traction ring 33.

Posts 112 also carry beneath flange 114 laterally extending posts 115 having wheels 116 transverse to wheels 113 and which bear laterally against the web of the traction ring 33. Accordingly, wheels 113 are confined against inadvertent disengagement with the flange track 114.

Between the posts 112, frame arms 87 are spanned by a support plate 117 on which a gear reduction box 118 for the drive sprocket 108 is mounted. The gears within box 108 receive power from the shaft 107 and constitute speed reducing mechanism for rotating the sprocket 108. Sprocket 108 has teeth 121 meshing with gear teeth openings 122 formed along the lower margin of the web of the traction ring 33. Sprocket 108 is desirablly backed by idler roller 123 mounted on pivot pin 124 on an arm 125 extending rearwardly from the hub 126 through which the drive shaft 129 for the sprocket 108 extends.

As best shown in FIGS. 8 and 11, the channel-shaped arms 87 are further provided with dual wheels 127 rotatable on vertical axes and which contact the wall 20 of the silo to maintain the auger conveyor 25 in proper position with respect thereto.

Figures 6, 7:
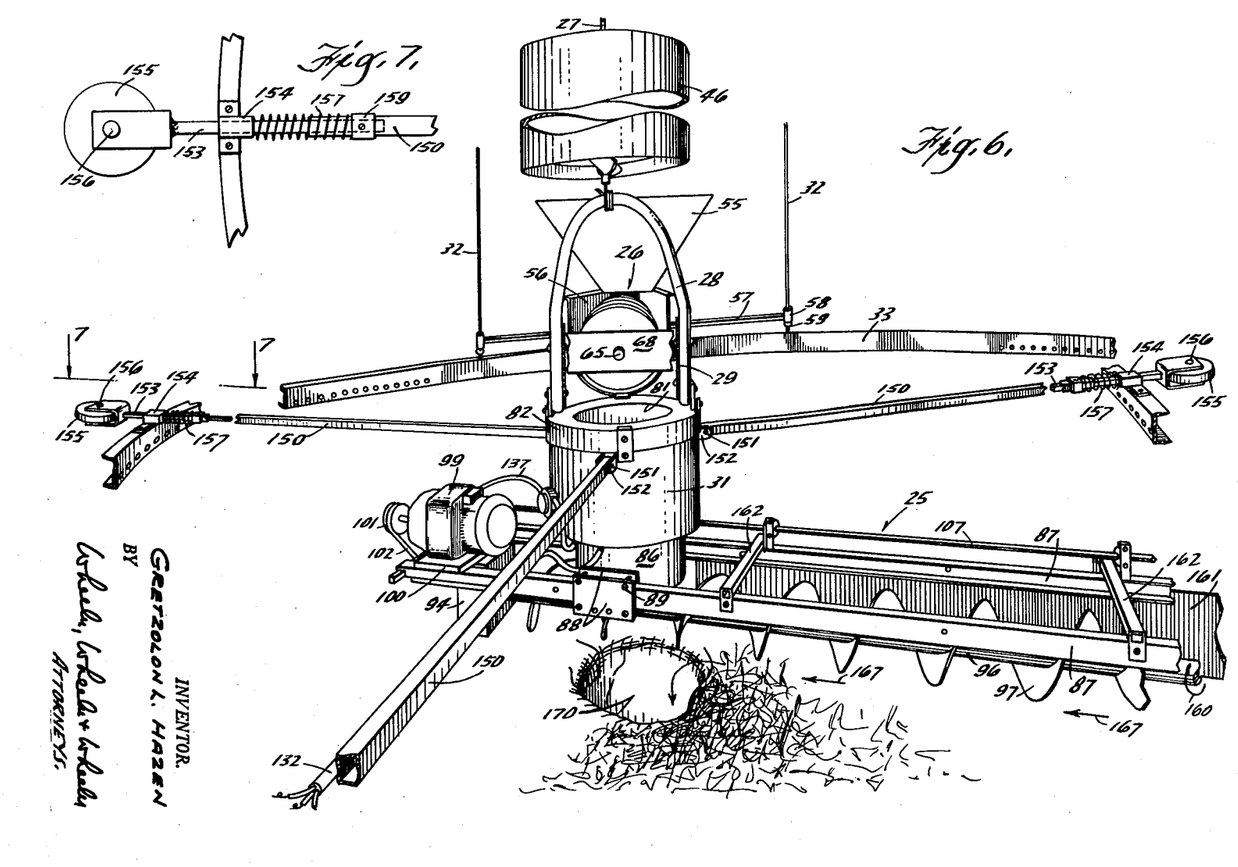
FIG. 6 is a perspective view similar to FIG. 5, but showing the parts of the silo handler as they are arranged in the course of gathering and discharging silage into the central channel.
FIG. 7 is a fragmentary plan view of one of the centering wheels for the silo handler, this view being taken along the line 7—7 of FIG. 6.

Electric motor 73 for auger conveyor 26 is wired electrically through a power cord 131. As best shown in FIGS. 6 and 10, electric power is independently supplied to motor 99 through power cord 132 connected to brushes 133 in brush box 134 which is fixedly mounted on the inside wall of slip ring shield 31. Electricity is transmitted to the motor 99 which rotates on frames 87 with respect to shield 31 by means of slip rings 135 mounted on slip ring band 136 attached to the suspension sleeve 86, and thence through power cord 137 to the motor 99.

Also suspended from the conveyer side arms 87 is hanger strap 140 having at its upper ends angle pads 141 fastened by bolts 142 to the outermost bracket pads 88. Hanger 140 is provided in substantial alignment with the turning axis of the conveyor 25 with spaced bracket ears 143 welded to opposite sides thereof and which carry a support pin 144 to which is connected the chain 145 on which the flue former or tube 46 is suspended when the apparatus is assembled for filling the silo.

Conveyor 26 remains at all times relatively stationary with its hopper 25 below the spout 54 of the silage blower. Stationary conveyor 26 feeds the silage 72 from hopper 55 in the direction of arrows 146 to the center of the silo where it will fall by gravity through the hollow sleeve 86 onto the inlet end of lower conveyor 25 to be fed outwardly towards the silo wall by the auger 97. Auger conveyor 97 is driven by the motor 99 as aforesaid and the sprocket drive 108 will concurrently be powered from motor 99 to rotate the conveyor 25 slowly on a horizontal path around the silo. In practice the driving parts are timed so that a complete sweep of the conveyor 25 about the silo will take about 15 minutes.

In order to distribute the silage uniformly throughout the cross section of the silo, the several trough sections 93 which are fastened by the bolts 147 or the like to the strap hangers 92 have their discharge margins 148 of progressively lower height from the center of the silo toward the outside wall thereof. This is clearly shown in FIGS. 5 and 8 in which the respective trough sections 93a, 93b, 93c and 93d have their discharge margins 148 over which the silage is discharged by the auger 97 progressively stepped lower. Auger 97 rotates clockwise as shown in FIG. 5, in the direction of arrow 149. Accordingly, as the level of the silage in the trough for conveyor 25 drops because of the continuous discharge of silage over margins 148, the side margin of the trough will be correspondingly lower and the silage will be uniformly distributed throughout the entire cross section of the silo for the uniform loading of the silo and for uniform packing of the silage about the channel forming tube 46.

Figure 12:
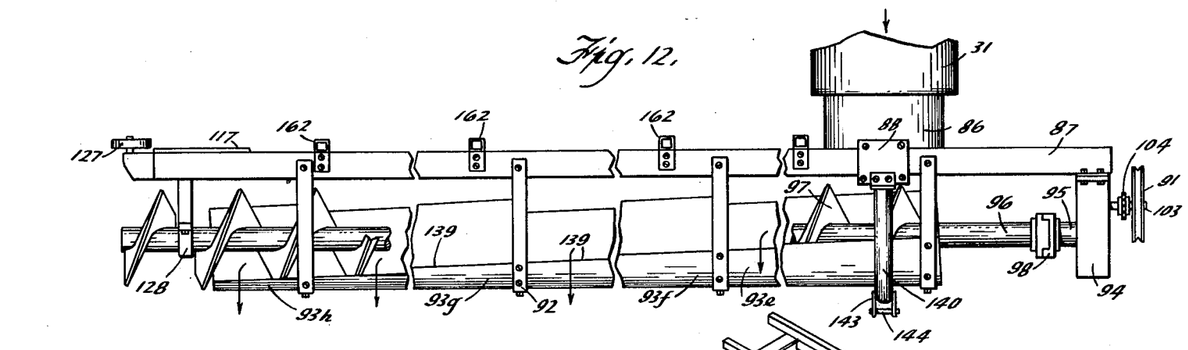
FIG. 12 is a side elevation of the silage handling auger conveyor otherwise shown in FIG. 8, but showing a modified form of discharge baffle.

An alternative embodiment for trough sections 93 is illustrated in FIG. 12 in which the trough sections 93e, 93f, 93g and 93h are illustrated as having inclined side margins 139 for a more gradual lowering of the level over which the silage must be fed in the course of silage discharge by auger 97

As aforestated, the silage will be uniformly distributed in the silo and will pack firmly about the tube 46 so that as the silage handler is lifted and the tube 46 withdrawn from support relationship to the packed silage the channel 170 left by the tube in the silage will be self-supporting.

Figure 3:
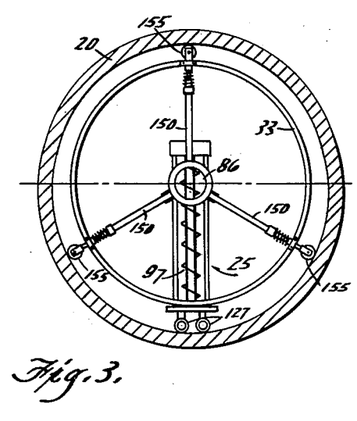
FIGS. 3 and 4 are horizontal cross sections taken through silos embodying the present invention and illustrating the apparatus for keeping the silo handler relatively centered.
Figure 4:
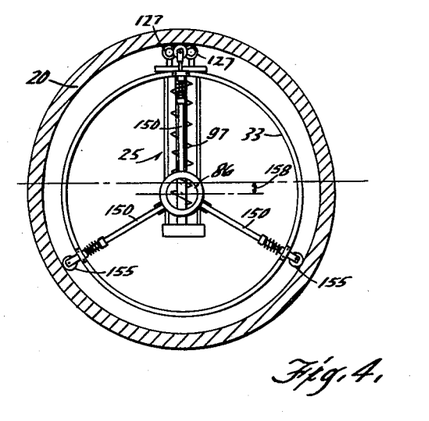

FIGS. 3 and 4 illustrate the fact that most silos will not be perfectly circular in cross section. Accordingly, means are provided to permit the silage handling device to yield slightly laterally as the conveyor 25 sweeps about the silo. For this purpose the silage handler is provided with stabilizing arms 150, preferably three in number and spaced apart through arcs of 120°. The inner ends of the arms 150 are pivotally connected to pivot pins 151 mounted on spaced mounting ears 152 welded to the shield 31, as best shown in FIG. 6. The arms 150 are desirably of hollow box section construction and receive in telescopic connection the square cross section stems 153 clamped in square cross section sleeves 154 fastened to the top flanges of the traction ring 33. Stems 153 carry on their outer ends wheels 155 which are aligned on the vertical axis of pins 156 to roll on the wall 20 of the silo. There are coil springs 157 which engage against collars 159 fixed on arms 150 to bias the wheels outwardly into continuous contact with the wall 20.

The traction ring 33 will not rotate on the axis of the silo to any substantial extent, inasmuch as it is biased by the weight of the silo handler into a relatively stable position in which the cables 32 are plumb, thus tending to prevent rotation of the traction ring 33 and providing the reaction thrust against which the motor 99 drives the conveyor 25.

In a slightly "out-of-round" silo, as illustrated in FIGS. 3 and 4, the center bearing 86 may in one position of conveyor 25 be concentric with the axis of the silo. However, after the conveyor 25 has been rotated on the axis of the silo through 180° to its position shown in FIG. 4, center bearing 86 may be off center by the distance indicated by reference character 158. In the course of displacing the traction ring 33 this distance, the springs 157 of the various arms 150 of the silo handler will respectively yield or expand to permit such movement while still maintaining the wheels 155, 127 in contact with the wall 20.

Assuming that the silo has been filled according to the aforesaid procedures and it is now desired to use the silage handler to unload the silo, the first step is to remove the channel-forming tube 46 from beneath the silo handler and shift it into a storage position. As best shown in FIG. 6, it is desirable to store the tube 46 above the handler and as part of the suspension system thereof in which the tube is hung on the cable 27 and intervenes between the cable 27 and the bail 28.

Figure 13:
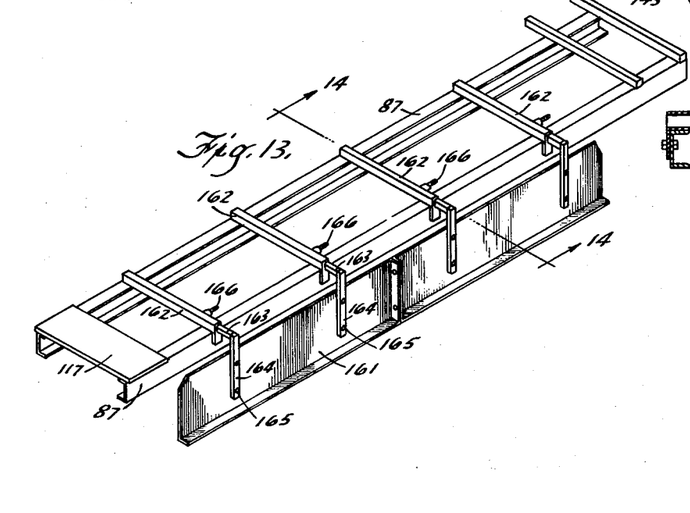
FIG. 13 is a fragmentary perspective view showing the auger conveyor frame and the baffle used in connection therewith for discharging silage from the silo according to the structure shown in FIG. 6.
Figure 14:
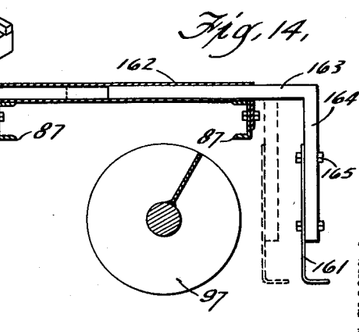
FIG. 14 is a cross section taken along the line 14—14 of FIG. 13.

The next step is to remove the trough sections 93 from the conveyor 25 and to replace these trough sections with a conveyor apron or shroud 161 best shown in FIGS. 6, 13 and 14. This is readily accomplished simply by removing the straps 92, together with the trough sections 93. The hollow tubular cross bars 162 which span between the channel-frame members 87 are adapted to receive telescopically therewithin the square cross section stems 163 of hanger brackets 164 to which the apron 161 is fastened by bolts 165 or the like. The stems 163 are adjustably clamped in the sleeves 162 by set screws 166. Accordingly, apron 161 can be positioned at any desired spacing from the auger 97, as is suggested in full and dotted lines in FIG. 14.

The device is now adapted to be used to unload the silo. For this purpose the motor 99 drives the auger 97 in the direction of arrow 160 in FIG. 6, this being the reverse of the direction which it was driven in FIG. 5. Silage is gathered in from the top layer of silage and pushed along apron 161 and in the direction of arrows 167 toward the channel 170 (FIG. 6) which was left in the silage by the tube 46 in the course of initially filling the silo. The conveyor 25 is also rotated in the silo in the opposite direction to which it was rotated when filling the silo and it will move clockwise as shown in FIG. 6. Accordingly, apron 161 is behind the auger to provide a reaction surface against which the auger can force this silage gathered from the top of the silage surface and toward the channel 170.

During the unloading of the silo, motor 73 is switched off and conveyor 26 remains inactive. Accordingly, only motor 99 is needed for unloading the silo and the only load on the motor is to sweep the conveyor 25 around the silo and to feed the silage toward the center thereof and into the channel 170. From that point on, the silage falls by gravity. Accordingly, the power consumed by the motor 99 is considerably less than that which would be otherwise required to power apparatus needed to lift or blow silage from the silo. As the silage is discharged, the silage handler will be gradually lowered on its cables 27, 32. This can be done under manual control or by timing appartus (not shown) in control of motor 45.

Figure 2:
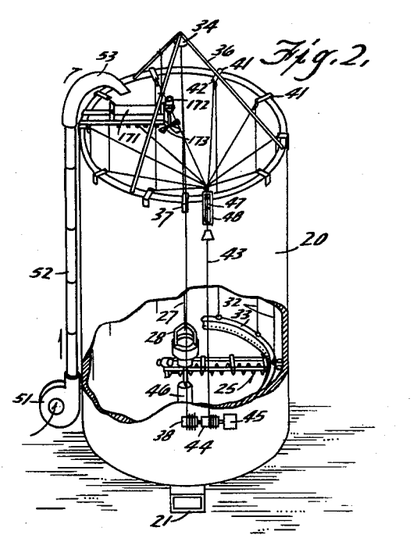
FIG. 2 is a small scale perspective view showing a silo in which another embodiment of silage handling apparatus emboying the invention is incorporated, portions of the silo wall being cut away to expose the operating mechanism.

FIG. 2 of the drawings illustrates a somewhat different modification of the device, particularly in the silo filling apparatus. In this embodiment of the invention, the silage handler is used only to unload the silo. Conveyor 25 is permanently provided with the apron 161, as shown in FIGS. 6, 13 and 14, and the silage distributing trough sections 93 otherwise shown in FIGS. 8 and 12 are omitted entirely. Conveyor 26 is also omitted entirely. In the FIG. 2 embodiment of the invention, the silage is distributed in the silo by discharging it from the blower spout 53 into a trough 171 which feeds into a rotary fan or disc spinner 173 powered by the motor 172. Accordingly, the silage is broadcast centrifugally throughout the cross section of the silo. The silo is loaded simply by operating the ensilage blower 51 and gradually lifting the silage handler by drawing in on cables 27, 32, as the silo fills. The rotor 173 distributes the silage throughout the cross section thereof and it packs about the tube 46. When the silo is filled, the tube 46 may be shifted to its storage position as shown in FIG. 6 and the silo unloaded as hereinbefore described.

The embodiment of the invention shown in FIGS. 1 and 3 through 14 is preferred over the embodiment shown in FIG. 2, in that a more uniform distribution of silage is achieved in the preferred embodiment.

What is claimed is:

1. The combination with a silo of a silage discharge conveyor at the bottom of the silo and having an inlet opening into the silo, a silage handler mounted in the silo, means for raising and lowering the handler, a channel former, means suspending the channel former from handler in substantial alignment with said conveyor inlet and by which said channel former is raised concurrently with the silage handler, means for distributing silage within the silo and around the former sufficiently compactly to leave a self-supporting channel through the silage as the handler is raised to draw the former upwardly with the handler and out of supporting relation with the packed silage.

2. The device of claim 1 in which said channel former is removable, said silage handler comprising means to gather silage from the surface thereof and discharge such silage into the said channel after said channel former has been removed.

3. The device of claim 1 in which said silage distributing means comprises a spinner for centrifugally spreading the silage about the silo.

4. The device of claim 1 in which said silage handler comprises a substantially horizontal conveyor, means for rotating said conveyor in a horizontal plane, said silage distributing means comprising means for supplying silage to the conveyor and means for discharging silage from the conveyor concurrently along substantially its entire length for uniform distribution thereof throughout the cross section of the silo.

5. Silage handling apparatus comprising the combination with a silo, of a silage discharge conveyor at the bottom of the silo and having an inlet opening into the silo, means for feeding silage into the silo at a point spaced above its bottom, a silage handler in the silo, means for distributing the silage relatively uniformly therein, a channel former removably suspended beneath the silage handler and about which said distributing means deposits the silage sufficiently compactly to leave a self-supporting channel through the silage as the handler is raised to draw the former upwardly with the handler and out of supporting relation with the packed silage, means for concurrently raising the handler and former in the course of filling the silo and said silage handler comprising means after the silo is filled and the channel former has been removed for gathering silage from the surface thereof and discharging such silage into the said channel.

6. The device of claim 5 in which the means for distributing silage comprises a rotor which receives silage from the means for feeding silage into the silo and which broadcasts said silage centrifugally therein.

7. The device of claim 5 in which the silage handler comprises means for distributing silage and includes a substantially horizontal conveyor, means for rotating said conveyor in a horizontal plane, and means for uniformly discharging silage from the conveyor concurrently along substantially its entire length.

8. The device of claim 7 in which said horizontal conveyor is mounted substantially radially within the silo with one end substantially at the center of the silo and its other end proximate the silo wall, said handler further comprising a second conveyor having a substantially radially fixed position in the silo and discharging into the first mentioned conveyor at the center of the silo whereby the first mentioned conveyor distributes the silage in the course of moving it from the center of the silo toward the wall thereof.

9. The device of claim 8 in which said first mentioned conveyor is provided with means for reversing the direction in which silage is conveyed thereby, said means being set to feed silage from the center of the silo toward the outer wall thereof while the silo is being filled and to feed silage from the outer wall of the silo toward the center when the silo is being emptied.

10. The device of claim 9 in which said first mentioned conveyor comprises an auger and removable apron means, means for mounting one of said apron means at one side of the auger for coaction with the auger when the auger rotates in one direction for distributing silage, means for mounting the other said apron means at the other side of the auger for coaction with the auger when it rotates in the opposite direction to unload the silo.

11. The device of claim 10 in which the first mentioned apron means comprises an auger trough having a top edge at one side thereof which is at progressively lower levels from the infeed end of the conveyor to its outflow end for progressive discharge of silage thereover along along the entire length of the auger conveyor.

12. Silage handling apparatus comprising a silo handling conveyor disposed substantially radially in a silo, a center bearing on which said conveyor rotates in a substantially horizontal plane about the silo, first cable means for suspending said bearing substantially at the center of the silo, a channel former and means suspending said former beneath the conveyor and in substantial alignment with said first cable means, a traction ring proximate the wall of the silo, second cable means for suspending the traction ring proximate the silo wall and a drive wheel mounted on the conveyor and drivingly engaged with the traction ring.

13. The device of claim 12 in further combination with centering rods extending from said bearing toward the silo wall and having wheels bearing on the wall and means yieldably biasing said wheels toward the wall.

14. Silage handling apparatus comprising a silo handling conveyor disposed substantially radially in a silo, a center bearing on which said conveyor rotates in a substantially horizontal plane about the silo, a first cable means for suspending said bearing substantially at the center of the silo, a traction ring proximate the wall of the silo, second cable means for suspending the traction ring proximate the silo wall and a drive wheel mounted on the conveyor and drivingly engaged with the traction ring, in further combination with a second conveyor having a relatively fixed radial position within the silo, an end of said second conveyor at the center of the silo being supported by the first cable means and the other end of the second conveyor being supported by the second cable means, and duct means through said bearing for transfer of silage from the second conveyor to the first conveyor.

15. A silage handler comprising a horizontal conveyor, a channel former removably suspended from the handler, means for suspending said handler in a silo and for concurrently raising and lowering both the handler and the former, and for drawing the former upwardly out of the silage after the silo has been filled and means for driving the conveyor in a horizontal plane around the silo to cut silage from the surface of the silage and feed it toward a vertical channel in the silage left by removal of said channel former.

16. The device of claim 15 is combination with a second conveyor above the conveyor first mentioned, said second conveyor being relatively stationary within the silo and having a hopper into which silage is loaded to be fed by said second conveyor into the first conveyor.

17. The device of claim 16 in which the conveyor first mentioned also comprise a silage distributing conveyor to receive silage from the second conveyor to distribute it uniformly about the silo in the course of rotating it about the silo axis.

References Cited in the file of this patent

UNITED STATES PATENTS

| | | |
|---|---|---|
| 1,479,990 | Keys | Jan. 8, 1942 |
| 2,677,474 | Long et al. | May 4, 1954 |
| 2,678,241 | Miller | May 11, 1954 |
| 2,827,156 | Linder | Mar. 18, 1958 |
| 2,926,772 | Reed | Mar. 1, 1960 |
| 2,963,327 | Seymour et al. | Dec. 6, 1960 |

FOREIGN PATENTS

| | | |
|---|---|---|
| 118,055 | Great Britain | Aug. 15, 1918 |
| 694,555 | France | Sept. 16, 1930 |
| 1,032,110 | France | Mar. 25, 1953 |